United States Patent [19]

Scharfy

[11] Patent Number: 4,515,332
[45] Date of Patent: May 7, 1985

[54] CULINARY UTENSIL SUPPORT

[76] Inventor: Madelon L. Scharfy, P.O. Box 249, Lake Arrowhead, Calif. 92352

[21] Appl. No.: 342,158

[22] Filed: Jan. 25, 1982

[51] Int. Cl.³ .............................................. A47G 21/14
[52] U.S. Cl. .................................... 248/37.3; 248/520; 211/60.1
[58] Field of Search ...................... 248/37.3, 37.6, 520, 248/538, 117.2, 110, 113, 150, 165, 529; 211/60 R; D6/130, 142; D7/72; 24/3 J; 108/34

[56] References Cited

U.S. PATENT DOCUMENTS

| | | | |
|---|---|---|---|
| 207,477 | 8/1878 | Baldwin | D7/72 |
| 370,942 | 10/1887 | Hanington | 248/37.6 |
| 561,212 | 6/1896 | Epstein | 108/34 |
| 807,840 | 12/1905 | Martin | 248/37.6 |
| 891,142 | 6/1908 | Bunnell | 248/37.6 |
| 1,107,543 | 8/1914 | Norton | D7/72 |
| 1,661,787 | 3/1928 | Chisholm . | |
| 2,371,537 | 3/1945 | Mangini . | |
| 2,664,005 | 12/1953 | Kosinski . | |
| 3,259,082 | 7/1966 | Williams | 108/28 |

*Primary Examiner*—William H. Schultz
*Assistant Examiner*—Robert A. Olson
*Attorney, Agent, or Firm*—Fraser & Clemens

[57] ABSTRACT

A rack for supporting culinary utensils and disposing the portion thereof containing food remnants, grease, and the like over a sink or other receptacle capable of collecting and disposing of the drippings.

3 Claims, 4 Drawing Figures

CULINARY UTENSIL SUPPORT

BACKGROUND OF THE INVENTION

1. Field of the Invention

This invention relates to cooking utensil supports and, more particularly, to devices for supporting spoons or the like over an adjacent area such as a sink.

2. Description of the Prior Art

An ever prevalent problem for those engaged in the culinary arts is the avoidance of drippings from the culinary implements during the periods of preparation of cuisine. Normally, during the preparation of foods, drippings from the implements and utensils employed usually are caused to collect on counter tops adjacent the mixing or cooking containers. The result, in addition to affecting the sanitary environment, is unsightly, and may produce permanent stains on the counter top material and, in certain instances, on adjacent floor covering.

The above, as well as other attendant problems, have plagued the culinary art field for a considerable length of time. Many attempts have been made to solve the problem with varying results. The efforts at solving the problems are manifested in U.S. Pat. No. 1,661,787 entitled "SPOON TRAY", A. R. Chisholm; and U.S. Pat. No. 2,664,005 entitled "CULINARY UTENSIL HOLDER", F. E. Kosinski. Theses patents disclose tray-type structures for holding culinary utensils during periods of non-use between various discrete steps in the cooking operations. In each instance, the individual structures embody integral trays having bottoms portions configured in such a fashion to enable drippings emanating from the utensil being held to collect therein. When the cooking operation has been completed, or alternatively, when the utensil is no longer needed, the holding structures of the patents are exposed to a separate cleaning operation.

Other attempts at solving the problems are illustrated by the U.S. Pat. No. 2,371,537 entitled "SPOON HOLDER", N. Mangini. The patent shows a typical structure used to releasably interconnect a spoon, for example, to the handle of a cooking pan. Any drippings remaining on the spoon after its use in stirring the contents of the cooking pan are caused to return to the contents from whence they emanated.

While the above, and many other structures have been developed to solve the "drippings problem", all seem to have necessitated separate cleaning operations, or require components which must be attached to the cooking containers and are typically cumbersome and annoying during later cooking steps involving transport, covering with appropriate lids, pouring, or the like.

SUMMARY OF THE INVENTION

The present invention has been designed to overcome the aforesaid problems and has for an objective, the object to produce a device for holding culinary utensils which may be readily employed to position such utensil over an adjacent sink, for example, to permit the drippings therefrom to fall therein and be easily directed to the associated drain.

An object of the invention is to produce a device for holding culinary utensils of a size which may be readily stored and quickly and easily removed from such storage mode to an operative mode.

Another object of the invention is to produce a device for holding culinary utensils during periods of non-use which accommodates to easy use and may be manufactured economically.

The above objects may be readily achieved by a support for a culinary utensil having a food manipulating portion and an interconnected spaced apart handle portion comprising at least a pair of spaced apart parallel support members, one of the members having an upwardly facing utensil engaging surface and the other of the members having a downwardly facing utensil engaging surface; and means for supporting the members in spaced relation above a supporting surface in spaced relation to one another whereby when a utensil is inserted at right angles to the members, the food manipulating portion thereof is adapted to be disposed in supported cantilevered spaced relation in respect of the support.

BRIEF DESCRIPTION OF THE DRAWINGS

The above, as well as other objectives and advantages of the invention will become readily manifest to one skilled in the art from considering the following detailed description of preferred embodiments of the invention when considered in the light of the accompanying drawings, in which.

DETAILED DESCRIPTION OF THE PREFERRED EMBODIMENTS OF THE INVENTION

Figure 1:
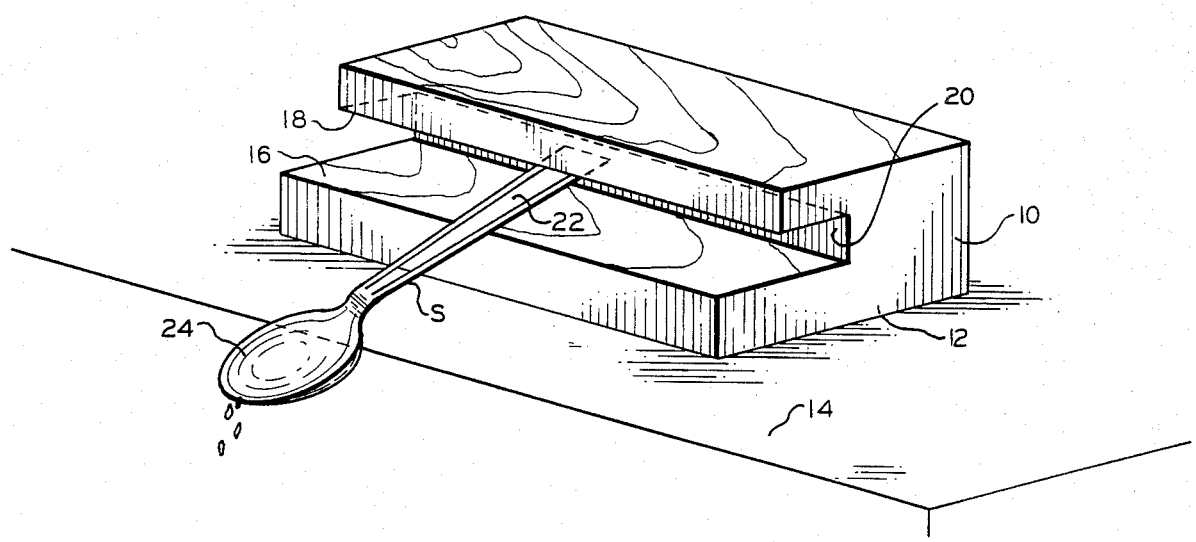
FIG. 1 is a perspective view of a device for supporting culinary utensils incorporating the features of the invention.

Referring to FIG. 1, there is illustrated a culinary utensil holding device incorporating the features of the invention. The device includes a main body portion 10, typically formed of wood, having a lower surface 12 adapted to be supported on a supporting surface 14 such as a kitchen sink top. The main body 10 is provided with a groove or channel defined by a lower upwardly facing surface 16, a spaced apart downwardly facing upper surface 18, and an interconnecting inner surface 20. The groove is typically formed in the main body 10 by routing a solid piece of wood stock, while this may well be the preferred and simplest method of fabricating the device illustrated in FIG. 1, it will be understood that the structure can be readily formed by a laminating process.

It will be further understood that in the embodiment of the invention illustrated in FIG. 1, the outermost free edge of the lower surface 16 extends outwardly a greater extent than the outermost free edge of the facing upper surface 18.

In use, the device is utilized to support a culinary utensil, such as for example, a spoon S having a handle portion 22 and a food manipulating portion 24. The spoon S is manually placed in the device in such a fashion that the handle portion 22 is disposed within the grooved portion and the opposite portion 24 extends outwardly of the device. The weight distribution of the spoon S is such that the weight of the end 24 is sufficient to cause the end of the handle 22 to be urged upwardly adjacent the downwardly facing surface 18 about the outer free edge of the upwardly facing surface 16 in a cantilevered manner.

The spacing between the cooperating surfaces 16 and 18 and the depth of the groove formed by the interconnecting inner surface 20 is determinative of the size, shape, length, etc. of the utensil which may be properly handled and supported by the supporting device.

Also, the amount of set-back of the free edge of the downwardly facing surface 18 in respect of the cooperating free edge of the upwardly facing surface 16 is a function of the ease with which the spoon S may be inserted into a position of support, and later grasped to be removed from the device.

In use, the supporting surface 12 of the device is positioned on a supporting surface 14 typically adjacent the periphery of a sink, for example, such that the spoon S may be disposed in a manner whereby any drippings emanating from the food manipulating portion 24 will fall into the sink for easy disposal.

While the aforegoing description has alluded to the device as being formed of wood, it will be clearly apparent that the device could also be formed of other materials, such as metal and plastic, for example.

Figure 2:
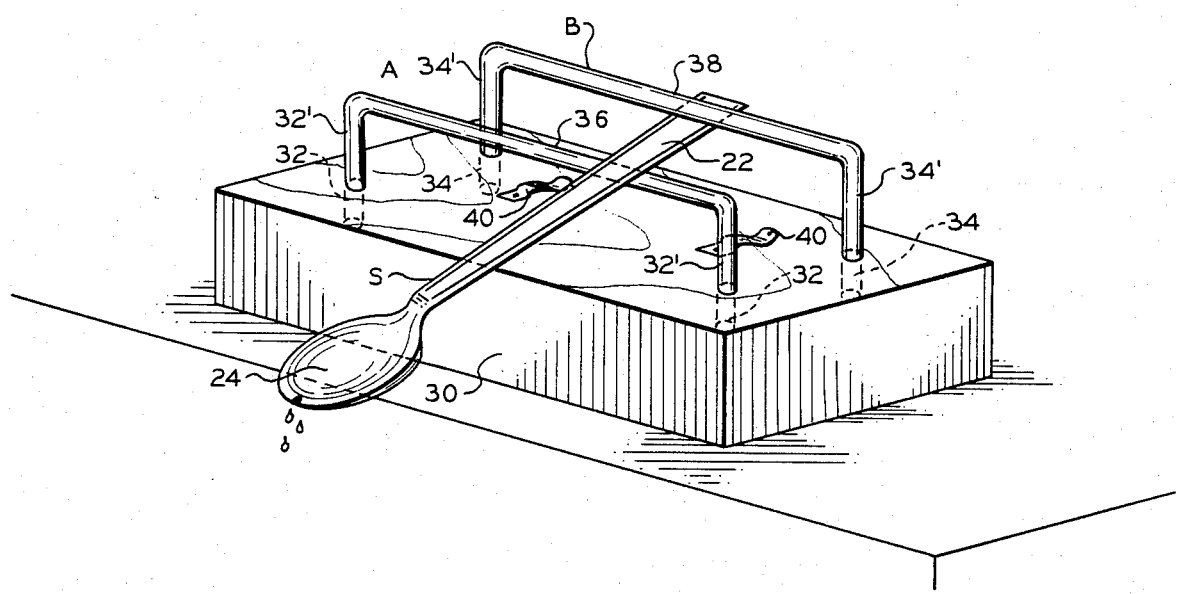
FIG. 2 is a perspective view of an alternative device for supporting culinary utensils embodying the features of the invention.

An alternate embodiment of the invention is illustrated in FIG. 2 wherein the supporting device includes a main body portion 30 preferably formed of a wooden block having two pairs of cooperating sockets 32 and 34 formed therein for receiving respectively downwardly extending leg portions 32' and 34' of generally U-shaped support members A and B, respectively.

The support member A is provided with a horizontally extending support section 36 interconnecting the legs 32'; and the support member B is provided with a horizontally extending support section 38 interconnecting the support legs 34'. The support section 38 is disposed at a level slightly higher than the level of the cooperating support section 36. Clearly, the relative positioning of the support sections 36 and 38 can be achieved by the length of the respective leg portions; or alternatively, by the depth of the associated sockets 32 and 34.

The upper surface of the block 30 may be provided with a pair of spaced spring clips 40 for securing the support members A and B thereto, in an out of the way inoperative position.

Figure 3:
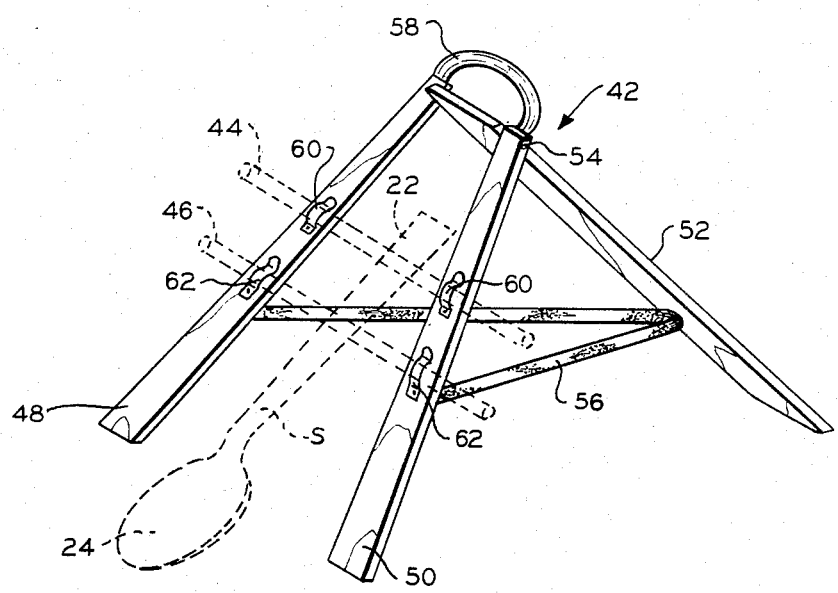
FIG. 3 is a perspective view of another embodiment of the invention employing structural features permitting the assemblage to be collapsed for storage and/or transit.

Referring now to FIG. 3, there is illustrated another embodiment of the invention which includes a tripod 42 for releasably supporting spaced, horizontally extending parallel support members 44 and 46, such as wooden dowels, for example.

The tripod 42 includes a pair of outer legs 48 and 50 and an intermediate leg 52, all pivotally interconnected at one of their ends by hinge means 54. The legs 48, 50 and 52 may be held in desired positions relative to each other by means such as tie straps 56 suitably secured to the legs, as illustrated. The hinge end of the legs 48 and 50 of the tripod 42 may be provided with a handle 58 for ease in carrying the tripod, particularly in a collapsed state.

The corresponding outer surface of the legs 48 and 50 each are provided with a pair of longitudinally spaced spring clips 60 and 62, respectively, arranged relative to each other for supporting the dowels 44 and 46 in an offset, spaced, parallel, horizontally extending relationship.

Figure 4:
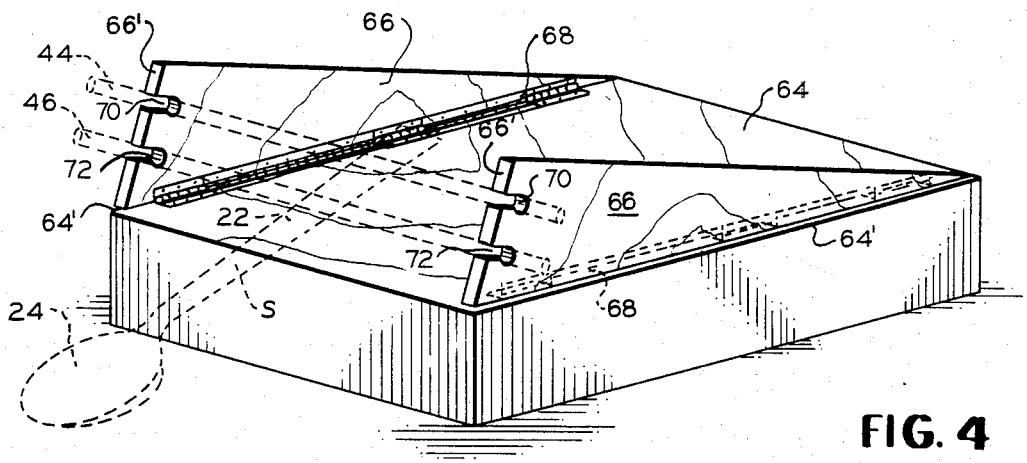
FIG. 4 is a perspective view showing still another embodiment of the invention incorporating collapsing features to achieve the objectives of the embodiment illustrated in FIG. 3.

A further embodiment of the invention, illustrated in FIG. 4, includes main a body portion 64 typically formed of a wooden block similar to the one illustrated in FIG. 2. Triangularly shaped flanges 66 are hingedly connected along each opposed side edge 64' of the block 64 by hinge means such as a piano hinge 68, for example.

One leg 66' of each flange 66 is provided with a pair of notched openings 70 and 72 arranged relative to each other for supporting a pair of offset, spaced, parallel, horizontally extending support members such as the dowels 44 and 46.

In use, the devices illustrated in FIGS. 2, 3 and 4 support a utensil such as the spoon S in the manner previously described in respect of the embodiment illustrated in FIG. 1. The handle portion 22 of the spoon S is positioned to extend beneath the lower surface of the upper support member and the opposite portion 24 extends outwardly beyond the lower horizontal support and rests on the upper surface thereof. The weight distribution of the spoon S in the devices is such that the weight of the end 24 is sufficient to cause the upper surfaces of the handle 22 to be moved upwardly adjacent the lower surface of the upper horizontal bar about the upper surface of the lower horizontally extending support member in a cantilevered manner.

In accordance with the provisions of the patent statutes, the principle and mode of operation of the invention has been explained and what is considered to represent its preferred embodiment has been illustrated and described. It should, however, be understood that the invention may be practiced otherwise than as specifically illustrated and described without departing from its spirit and scope.

What I claim is:

1. The combination of a support and a culinary utensil wherein said utensil includes a food manipulating portion and an interconnected handle portion; and said support includes a pair of parallel spaced apart horizontally extending, substantially coextensive support members, one of the support members having a horizontally extending upwardly facing utensil engaging portion of straight line configuration and the other of the support members having a horizontally extending downwardly facing utensil engaging portion of straight line configuration, the downwardly facing utensil engaging portion being at a level higher than the level of the upwardly facing utensil engaging portion, and a body means for maintaining said support members and including a bottom surface for supporting said support members in spaced relation above a supporting surface, and each support member including downwardly extending columnar members at ends thereof releasably interconnected with said body means, whereby said utensil is disposed at a substantially right angle to said support members with the handle portion thereof adapted to extend between said support members with the handle portion thereof most adjacent the food manipulating portion supported on the upwardly facing utensil engaging portion of one of said support members and the handle portion most removed from the food manipulating portion supported by the downwardly facing portion of the other of said support members thereby causing the food manipulating portion of said utensil to be disposed in spaced relation from said support.

2. The invention defined in claim 1 wherein said body means is provided with a plurality of spaced apart means for releasably securing said support members.

3. The invention defined in claim 2 wherein said means for releasably securing said support members to said body means includes spring clips.

* * * * *